3,611,744
CRYOGENIC PICKUP
Richard K. Sutz, Riverdale, N.Y. (% International Symbiotics, Inc., 733 Yonkers Ave., Yonkers, N.Y. 10704)
Filed May 11, 1970, Ser. No. 36,212
Int. Cl. B65h 3/00
U.S. Cl. 62—303
10 Claims

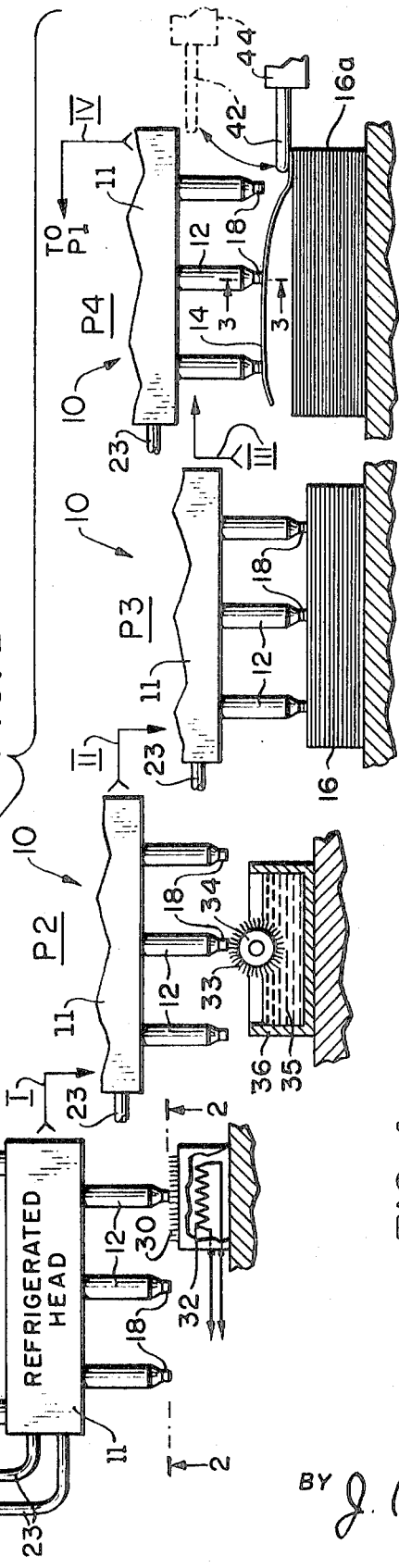
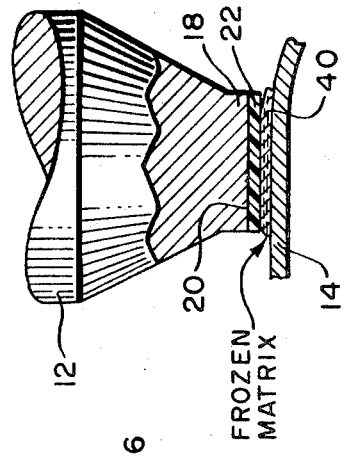
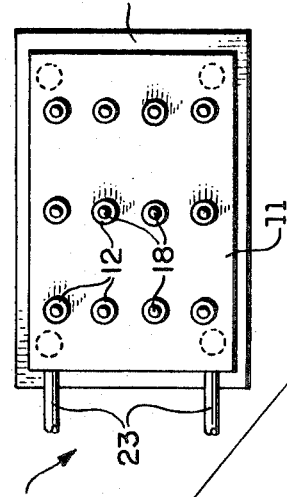
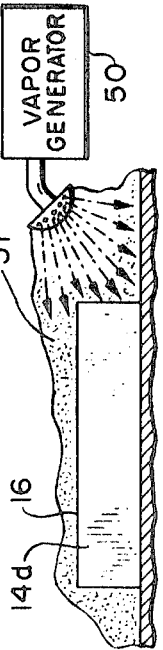
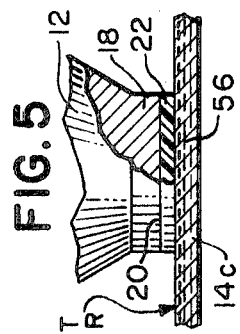
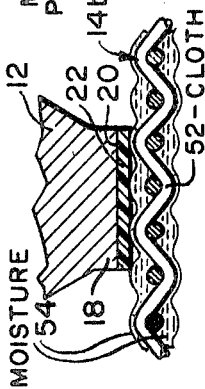
INVENTOR:
RICHARD K. SUTZ
BY J. B. Burke
ATTORNEY.

ABSTRACT OF THE DISCLOSURE

Cryogenic apparatus for cyclically picking up and transferring one article at a time from a pile thereof, includes a plurality of probes continuously maintained at freezing temperature. The probes are movable as a unit by a carrier in a path from a starting position. One article at a time is picked up and transferred to a deposition point where a stripper device detaches the article bonded by ice matrices to the probes. A cleaning device in the path of the probes wipes them clean before they contact the article to be picked up. A moistener may apply a film of moisture to each probe tip before it contacts the article. Each probe tip may be covered with a self lubricating layer to facilitate detachment of the article. A vaporizer for humidifying the articles may be provided.

---

This invention concerns a method and apparatus for picking up and transferring articles by means of cold probes.

The invention is particularly directed at the problem of separation and pickup of porous sheets one at a time from a stack, transferring the picked up sheet to a deposition point and accurately depositing the sheet at the picked up point.

Heretofore the apparel and laundry industries have sought to solve the problem of picking up limp sheets in a dry or wet state in the following ways among others:

(1) Air foil separation and mechanical conveyance. In this method a blast of air is blown against the side of a stack of precut and aligned plies or layers of cloth, paper or plastic material. A blast of air is directed at the uppermost layer and lifts it while the remainder of the stack is held down by mechanical or vacuum means.

(2) Mechanical pickup by pinch techniques. In this method the uppermost layer of a stack is mechanically gripped by a pinching device and the gripped layer is lifted off the stack.

(3) Mechanical pin pickup. In this method where layers are thick enough to permit it, pins are inserted in the uppermost layer to lift it off the stack.

(4) Pressure sensitive tape pickup. Here the uppermost layer of a stack is contacted by a pickup device presenting a pressure sensitive surface to the uppermost layer.

(5) Vacuum pickup. Here suction devices are applied to the uppermost layer which is then lifted up mechanically.

None of the pickup techniques heretofore employed have proven sufficiently reliable where high speed, automatic, repetitive pickup is required. Some of the prior methods just cannot be used with highly porous, wet or damp fabrics. Others cannot be used with nonporous dry sheets such as plastic. Still other cannot be used with massive, heavy articles or articles having rough or uneven surfaces.

The present invention resorts to a cryogenic technique. It has been proposed heretofore to employ thermoelectric apparatus which freezes a liquid medium sprayed on a load and thereby bonds a lifting head to the load. The thermoelectric apparatus is then reversed electrically to melt the frozen liquid and thereby release the lifting head from the load. This apparatus and method are objectionable for a number of reasons. The thermoelectric units are complicated, expensive and unreliable in operation. The cyclic freezing and melting of the liquid medium is slow and not precisely controllable. The spraying of water over the entire surface of an article such as a paper sheet is highly objectionable.

The above and other difficulties, disadvantages and objections of prior pickup apparatus and techniques are overcome by the present invention. Here a lifting head is provided with one or more refrigerated probes. In one method the cold probes are wiped clean. A film of water is applied to the tips of the probes and the probes are then applied to an article to be picked up before the water film freezes. Freezing of the film forms a solid matrix on each probe. The article is then lifted and transferred to a deposition point where the article is stripped off the probes. Since the contact points between the probes and solid matrices are very small, the probes easily separate from the frozen matrices. Light delicate articles such as thin plastic or cloth sheets can be handled by this technique. Where articles are porous such as woven or unwoven cloth, paper and the like, they may contain enough moisture absorbed from the ambient air to be lifted by the cryogenic technique of the present invention without application of water films to the probes. The principles of the invention are applicable to loads of diverse types. They are applicable to articles having rough surfaces, to heavy articles made of wood, rubber, leather, etc. They are applicable to articles having smooth, monporous surfaces such as glass, porcelain, plastic, metal, etc.

Other and further features objects and advantages of the invention will become apparent from the following detailed description taken together with the drawing, wherein:

FIG. 1 is a diagrammatic representation partially in side elevation and partially in section of cryogenic pickup apparatus according to the invention shown in several successive stages of a lifting operation.

FIG. 2 is a bottom plan view taken on line 2—2 of FIG. 1.

FIG. 3 is a magnified fragmentary sectional view taken on line 3—3 of FIG. 1, through a tip of a cold probe, frozen matrix and nonporous sheet bonded thereto.

FIG. 4 is a sectional view similar to a portion of FIG. 3, showing the tip of a cold probe bonded to moist or wet cloth.

FIG. 5 is a sectional view similar to a portion of FIG. 3, showing the tip of a cold probe bonded to moist paper.

FIG. 6 is a diagrammatic view of a stack of sheets or plies with means for applying moisture films thereto by vaporizing the atmosphere around them.

Referring first to FIGS. 1 and 2, there is shown an assembly 10 including a pickup head 11 which serves as a support for a plurality of pickup probes or fingers 12 depending from the head 11. The probes are disposed in a spaced, two dimensional array to encompass a major portion of the area of an article such as a sheet 14 on a stack 16 thereof. The probes are generally cylindrical and terminate in narrow tips 18 formed with flat ends 20 which may have thin resilient coatings 22 thereon; see FIG. 3. Each probe is preferably made of thermally conductive material such as metal and is kept in a cold condition below 0° C. by suitable refrigeration means via head 11. According to the invention, no limitation is placed on the type of refrigeration means used. Head 11 could contain solid carbon dioxide, liquid oxygen or liquid nitrogen, or the like. Alternatively the head could contain a chilled refrigerant such as Freon circulating through flexible pipes 23 connected to a suitable refrigerator 25. Head 11 is supported by a carrier 26 which is mechanically movable from side to side and up and down as indicated by crossed arrows A. The probes are maintained continuously in a cold condition by refrigerated head 11.

FIG. 1 shows the assembly 10 of carrier 26, head 11 and probes 12 at an initial position P1 just starting a pickup and transfer cycle wherein a sheet 14 is picked up from the top of stack 16 and transferred to another pile or stack 16a at a deposition point or work station. As indicated by right angled arrow I, the head 11 moves horizontally and then downwardly. As the head moves horizontally, the tips of the probes 12 are wiped clean by a cleaning device 30 such as a brush disposed in the path of movement of the probes. The brush can be heated by a heater 32 to loosen more easily particles of ice which may cling to the tips of the probes, but in general heating of the brush will not be required. Cleaning is facilitated by the smooth resilient coating 22 bonded to each probe tip. This resilient coating can be a silicone rubber, a polyfluoroethylene or the like. Such materials have nonsticking, self lubricating properties admirably well suited for purposes of the present invention.

The assembly 10 moves past the cleaning device 30, then down to position P2 over a roller 34 rotatably mounted in a container of water on a shaft 33. The upper part of the roller extends above the surface of water 35 in container 36. The roller may carry short bristles 38. As the tips of the probes brush past roller 34 a thin film of water is applied to the bottoms of tips 18. Immediately thereafter and before this film of water freezes, assembly 10 moves laterally and downwardly in path II to position P3. Here the tips of the probes touch the uppermost sheet 14 on the pile or stack 16. The film of water freezes to form a matrix of ice 40 between each probe tip 18 and sheet 14 as clearly shown in FIG. 3. The matrix serves as a bond between the probe tip and sheet. The assembly 25 then moves up and laterally in path III to position P4. At this position a stripper bar or plate 42 carried by a vertically movable support engages one edge 14a of sheet 14 and holds it down on the stack 16a of transferred sheet. Then assembly 10 moves up and laterally in path IV back to position P1 to start another pickup and transfer cycle.

FIG. 3 shows the stripping action on sheet 14. It will be noted that the frozen matrix 40 tends to separate more easily from resilient coating 22 on tip 18 than it does from sheet 14, as indicated at the right end of the matrix. This minute bit of ice subsequently melts and evaporates. If it is found undesirable to have the matrices of ice left on sheet 14 for any reason, resilient coating 22 can be omitted so that the ice matrices cling to the tips of the probes while the sheet 14 is stripped away. The frozen matrices will subsequently be wiped away at position P1 by cleaning device 30.

FIG. 4 shows on an enlarged scale a section of cloth 14b. The threads 52 are normally surrounded or saturated with moisture 54 absorbed from the ambient atmosphere. Alternatively the cloth can be wet or moist from a prior washing or dyeing process. When the frozen tips of the probes 12 contact cloth 14b, the moisture under the tips freezes to form matrices which bond the cloth to the tips of the probes. In this instance, it will not be necessary to apply films of water to the tips of the probes at position P2 shown in FIG. 1. The cloth will be stripped away from the probes in the same manner as shown at position P4 in FIG. 1. Residual ice will be removed from the tips of the probes by cleaning device 30 at position P1 of the assembly.

FIG. 5 shows a section of a porous sheet 14c such as paper which has absorbed moisture 56 from the ambient atmosphere. Here also prior wetting of the probe tips will not be required. The cold probe tips will bond to the moist sheet. It is quite possible that the sheet 14c may appear dry, however it will be sufficiently moist for bonding to take place to the cold tips of the probes. Sheet 14c will be stripped away from the probes in the same manner as indicated at position P4 of FIG. 1.

If necessary the humidity of the ambient air can be adjusted so that porous cloth, paper or other materials to be picked up and transferred by the cold probes, will absorb sufficient moisture. FIG. 6 shows a water vapor generator 50 emitting a cloud of vapor 51 which envelops the surface of an article 14d to be picked up by the probes. This article can be of any desired physical characteristics, hard or soft, light or heavy, porous or nonporous. The top surface 60 can be rough or smooth. In any case the article will be picked up by application of the cold tips of the probes. Stripping will be done by any suitable mechanical means as indicated in FIG. 1. However the probes will remain cold at all times. This is necessary to permit automatic rapid cyclical pickup and transfer of articles.

The present invention, it will now be apparent, overcomes objections heretofore encountered with prior pickup devices. Spraying of water to form a pool on an article to be picked up is avoided. In fact, if water were heavily sprayed on articles to be picked up, thick coats of ice would form on the tips of the probes which could not be wiped away. This would soon render the apparatus inefficient or inoperative. To operate efficiently the moisture must be a very thin film applied to the probe tips or to the article to be picked up, if the article does not already contain sufficient moisture absorbed from its environment or taken up during prior processing such as washing, dyeing or the like.

While a limited number of embodiments of the invention have been illustrated and described, many modifications will occur to those skilled in the art, without departing from the scope of the invention herein.

What is claimed is:

1. Cryogenic apparatus for a cyclically picking up and transferring one article at a time from a pile thereof, comprising a plurality of probes continuously maintainable at a temperature below 0° C. to contact an article and bond thereto by freezing ice matrices therebetween; a carrier for said probes arranged to move the same cyclically in a predetermined path from a starting position to pick up one article at a time and to transfer the picked up article to a deposition point; and stripping means disposed at said deposition point and arranged to engage each picked up article in turn and to detach the same from the probes while the probes return to said starting position.

2. Cryogenic apparatus as defined in claim 1, wherein each probe has a free tip, said apparatus further comprising cleaning means disposed in said path to wipe the tips of the probes clean and clear of ice before each article is picked up by the probes.

3. Cryogenic apparatus as defined in claim 2, further comprising moistening means disposed in said path and arranged to apply a film of moisture to the tip of each probe immediately before each probe contacts said article for picking it up.

4. Cryogenic apparatus as defined in claim 1, further comprising means for maintaining said articles in a moist condition, so that a film of moisture is present at the surface of each article to be contacted by the cold probes.

5. Cryogenic apparatus as defined in claim 4, wherein each probe has a free tip, and cleaning means disposed in said path to wipe the tips of the probes clean and clear of ice before each article is picked up by the probes.

6. Cryogenic apparatus as defined in claim 1, further comprising a refrigeration head carried by said carrier, said probes being secured to said head in spaced parallel array to encompass an area of an article to be picked up by the probes, said probes being continuously maintained by said head at said temperature below 0° C.

7. Apparatus as defined in claim 6, wherein said probes are made of thermally conductive material to facilitate their maintenance in cold condition.

8. Apparatus as defined in claim 6, wherein each probe terminates in a small free tip to minimize the area of contact between each probe and the article picked up thereby.

9. Apparatus as defined in claim 8, further comprising a resilient, self lubricating layer bonded to the tip of each probe to facilitate separation of the ice matrices therefrom.

10. Apparatus as defined in claim 1, wherein each probe has a free tip, and further comprising moistening means disposed in said path and arranged to apply a film of moisture to the tip of each probe immediately before each probe contacts said article for picking it up.

References Cited

UNITED STATES PATENTS

| | | | |
|---|---|---|---|
| 1,648,115 | 11/1927 | Dickman et al. | 271—33 |
| 3,296,812 | 1/1967 | Cloudy | 62—380 X |

JOSEPH WEGBREIT, Primary Examiner

B. H. STONER, Jr., Assistant Examiner

U.S. Cl. X.R.

271—18, 33; 294—1; 62—322